Sept. 24, 1957 J. J. BLUM 2,807,356
PROTECTIVE PACKING DEVICE FOR AUTOMOBILE FENDERS
Filed June 7, 1955 2 Sheets-Sheet 1
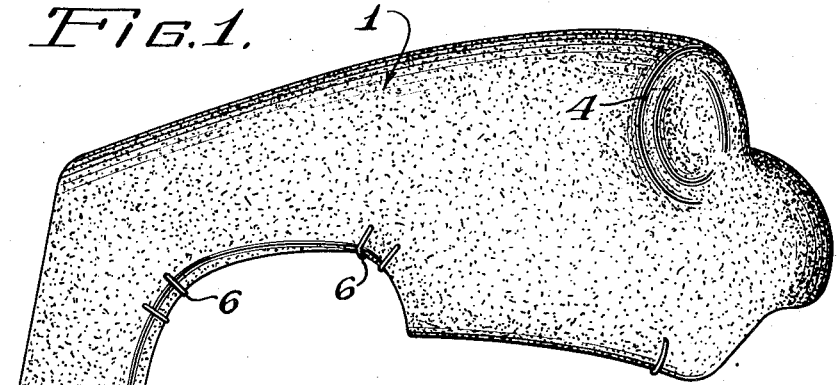
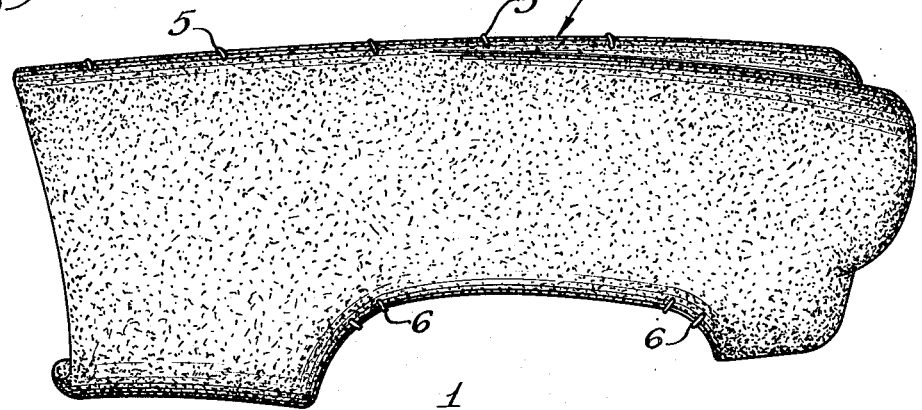
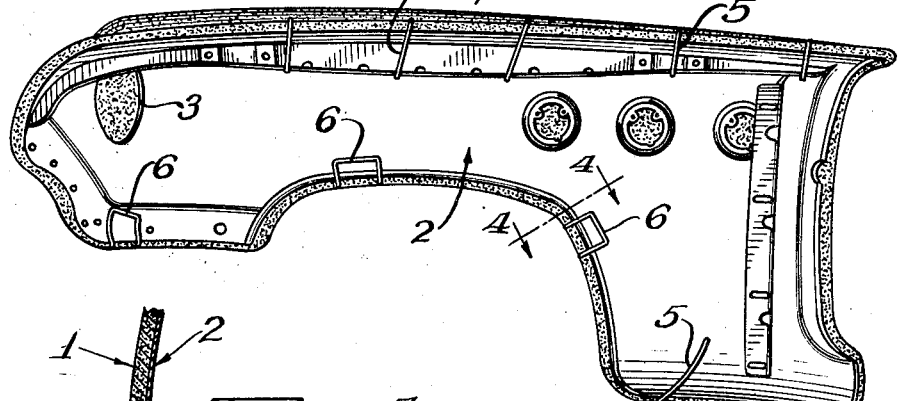
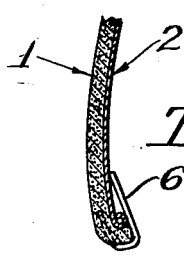
Inventor:
Jerome J. Blum
By Gary, Desmond & Parker Attys.

Sept. 24, 1957  J. J. BLUM  2,807,356
PROTECTIVE PACKING DEVICE FOR AUTOMOBILE FENDERS
Filed June 7, 1955  2 Sheets-Sheet 2
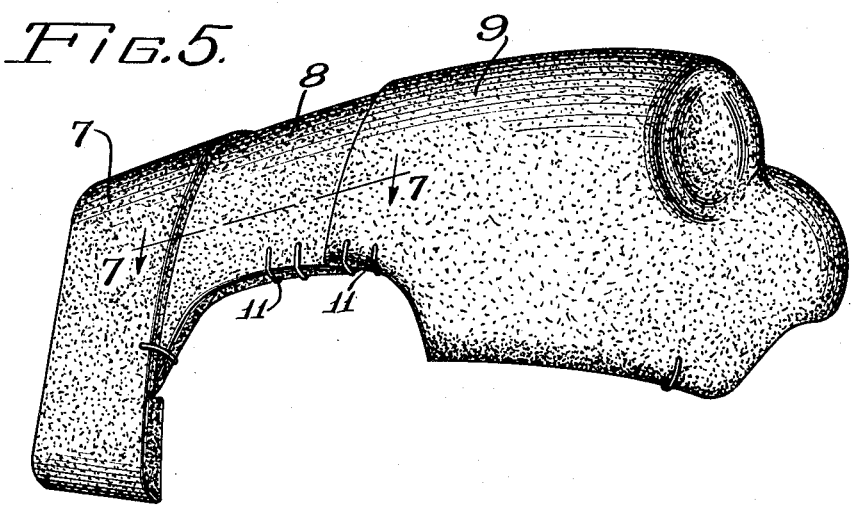
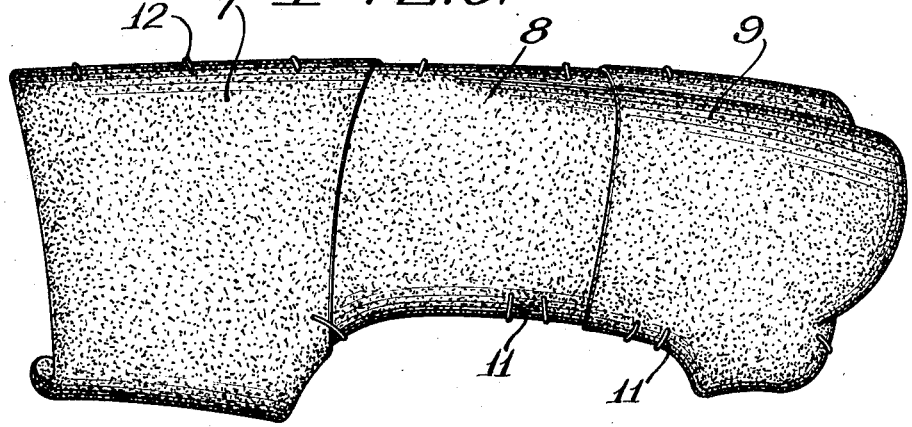
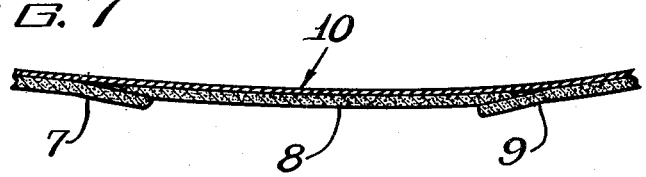
Inventor:
Jerome J. Blum
By Gary, Desmond & Parker
Attys.

United States Patent Office 2,807,356
Patented Sept. 24, 1957

2,807,356

PROTECTIVE PACKING DEVICE FOR AUTOMOBILE FENDERS

Jerome J. Blum, Olean, N. Y., assignor, by mesne assignments, to Arvey Corporation, Chicago, Ill., a corporation of Delaware Application June 7, 1955, Serial No. 513,780

2 Claims. (Cl. 206—46)

This invention relates to improvements in a packing device for packing and protecting irregularly shaped objects in storage and shipment, and refers particularly to a device for packing or packaging automobile fenders.

In storing and shipping irregularly shaped objects it is extremely difficult to pack or package them so as to protect them adequately and at the same time conserve space. This is particularly true with regard to automobile fenders which may be stored and shipped as units.

The present invention has as one of its important objects the provision of a protective packing which conforms substantially to the conformation of the object protected and, refers specifically to an encasing protective device which conforms with an automobile fender and encases and protects the outer, highly finished portion of the fender.

Another important object of the invention resides in a protective packing of the type described which is constructed of felted fibres and can be conveniently formed in the shape of the automobile fender to be protected.

A further important feature of the invention resides in the provision of a plurality of securing members for securing the packing to the fender being protected, the securing members being embedded in the margins of the packing and comprising a unitary portion of the packing.

Other objects and advantages of the invention will be apparent from the accompanying drawings and following detailed description.

In the drawings:

Fig. 1 is a perspective view illustrating a packing device applied to an automobile fender for protecting a front fender of an automobile.

Fig. 2 is a side elevational view of the device shown in Fig. 1.

Fig. 3 is an elevational view of the inner surface of an automobile fender having a packing device, such as illustrated in Figs. 1 and 2, applied to the outer surface thereof.

Fig. 4 is a detailed fragmentary sectional view taken on line 4—4 of Fig. 3.

Fig. 5 is a perspective view of a modified form of the invention wherein the packing device comprises a plurality of parts.

Fig. 6 is a side elevational view of the device shown in Fig. 5.

Fig. 7 is a detailed fragmentary sectional view taken on line 7—7 of Fig. 5.

Referring in detail to the drawings, 1 indicates generally a protective packing device for embracing and covering the outer highly finished surface of a front fender 2 of an automobile. Although the present invention is shown and described in conjunction with a front fender packing and protector, it is to be understood that the invention also may be employed in packing and protecting rear fenders of a vehicle.

The protective packing device 1 comprises a felted fibrous body which is preferably constructed by immersing a foraminous form, of a shape similar to the shape of the fender to be protected, in an aqueous pulp solution; applying vacuum to the form to deposit the fibres of the pulp upon the surface of the form while drawing the aqueous carrier of the pulp through the form and subsequently, when a desired thickness of fibres has been deposited upon the form, drying said fibres and removing the formed fibres from the form. Preferably a binder is incorporated in the pulp which adds strength to the protective device.

Although the formed device 1 is relatively rigid after it is dried and is self-supporting its surface, comprising fibres, is relatively soft and non-abrasive and, hence, the device may be positioned over and in contact with the highly finished surface of the fender 2 without scratching or marring said surface.

In the fender 2 illustrated in the drawings, a recess 3 is provided therein for the reception of a headlight. In forming the device 1, a rim or annular bead 4 is formed in registration with the defining edge of the recess which, as will be hereinafter more fully described, when the protective packing is secured to the fender, functions to interlock the device 1 upon the fender and assists in preventing relative movement of the device 1 upon the fender.

As one of the features of the present invention, fastening devices 5 and 6 are carried by the device 1 as unitary portions of the device itself. The fastening devices 5 comprise wire members having end portions which are embedded in the thickness of the felted formed device, the opposite end portions of the wires protruding from the edge portions of the device 1 whereby they may be bent into engaging relationship with inner portions of the fender. Some or all of the fastening devices may be of the type illustrated at 6, as best shown in Fig. 3, wherein both end portions of the wires may be embedded in the thickness of the felted device 1, and having loops protruding from the device which may be bent into engagement with inner portions of the fender 2.

Thus a protective packing device is constructed which will effectively protect the highly finished surface of a fender and which carries its own fastening means which, taken in conjunction with the form fitting of the protective device, will render the protective device substantially immovable upon the fender.

If desired, the protective device may be constructed in parts, as shown best at 7, 8 and 9 in Figs. 5, 6 and 7. As shown in these figures, the portion 7 is adapted to embrace the outer face of the rear end of a fender 10, the portion 9 being adapted to embrace the front end portion of the fender, and the portion 8 being adapted to embrace the central portion of the fender between the portions 7 and 9.

The portions 7, 8 and 9 may be constructed in substantially the same fashion as the device 1, that is, the portions 7, 8 and 9 may be constructed of felted fibres. In addition, fastening devices 11, similar to devices 6, hereinbefore described, and fastening devices 6, hereinbefore described, and fastening devices 12, similar to devices 5, may be embedded in the thicknesses of the portions and may protrude outwardly whereby they may be engaged with the rear face of the fender 10.

Although the fenders 2 and 10 are of substantially similar shape and a single packing device 1 may embrace said fenders, some types of fenders are of such shape that they cannot be embraced by a single packing device. In such cases, packing devices made in parts, such as illustrated in Figs. 5, 6 and 7, find their greatest utility. However, even where a fender may be embraced by a single device, other considerations may dictate the use of a packing device constructed in parts.

It can readily be seen that herein is contemplated a protective packing which is effective in protecting a highly finished surface such as an automobile fender; is light in weight; occupies a minimum space, and is sufficiently rigid to protect the fender from impacts encountered in storage and shipment.

I claim as my invention:

1. A protective packing device for an automobile fender which comprises a relatively rigid felted fibrous body conforming in shape substantially to the shape of a portion of the outer surface of a fender and adapted to embrace and cover said portion of the outer surface of said fender, and bendable wire securing means comprising a unitary portion of said packing device having portions permanently embedded in the thickness of the felted fibrous body adjacent certain defining edges thereof and having portions protruding from said body for bendable removable engagement with the inner surface of the fender which the packing device embraces.

2. A protective packing device for an automobile fender which comprises a relatively rigid felted fibrous body conforming in shape substantially to the shape of the outer surface of a fender and adapted to embrace and cover substantially the outer surface of said fender, and bendable wire securing means comprising a unitary portion of said packing device having portions permanently and substantially rigidly embedded in the thickness of the felted fibrous body adjacent certain defining edges thereof and having portions protruding from said body for bendable removable engagement with the inner surface of the fender adjacent edges thereof which the packing device embraces.

References Cited in the file of this patent

UNITED STATES PATENTS

| | | |
|---|---|---|
| 1,611,575 | Avlbach | Dec. 21, 1926 |
| 2,486,711 | Harris | Nov. 1, 1949 |
| 2,551,374 | Hansen | May 1, 1951 |